(12) United States Patent
Reinders

(10) Patent No.: US 7,428,823 B2
(45) Date of Patent: Sep. 30, 2008

(54) EVAPORATIVE COOLER WITH ANTIMICROBIAL PROVISIONS

(75) Inventor: Johannes Antonius Maria Reinders, Warnsveld (NL)

(73) Assignee: Oxycell Holding B.V., Heerenveen (NL)

( * ) Notice: Subject to any disclaimer, the term of this patent is extended or adjusted under 35 U.S.C. 154(b) by 150 days.

(21) Appl. No.: 10/543,125

(22) PCT Filed: Jan. 23, 2004

(86) PCT No.: PCT/EP2004/000561

§ 371 (c)(1), (2), (4) Date: Jul. 22, 2005

(87) PCT Pub. No.: WO2004/065857

PCT Pub. Date: Aug. 5, 2004

(65) Prior Publication Data

US 2006/0137380 A1    Jun. 29, 2006

(30) Foreign Application Priority Data

Jan. 23, 2003    (NL) .................................. 1022478
May 19, 2003    (NL) .................................. 1023471

(51) Int. Cl.
*F28D 5/00*    (2006.01)
(52) U.S. Cl. ........................................................ 62/304
(58) Field of Classification Search .................. 62/304, 62/176.2, 271, 274
See application file for complete search history.

(56) References Cited

U.S. PATENT DOCUMENTS

| 4,002,040 | A |   | 1/1977  | Norback et al. |
| 4,730,462 | A | * | 3/1988  | Rogers ........................ 62/171 |
| 5,301,518 | A |   | 4/1994  | Kanachine et al. |
| 5,731,081 | A | * | 3/1998  | Esu ............................. 428/375 |
| 6,333,077 | B1 | * | 12/2001 | Maag et al. ................. 427/496 |
| 6,427,453 | B1 | * | 8/2002  | Holtzapple et al. ............ 62/92 |

FOREIGN PATENT DOCUMENTS

| BE | 1013160    | 10/2001 |
| GB | 2326938    | 1/1999  |
| JP | 11 248389  | 9/1999  |
| JP | 2000 140116 | 5/2000 |
| JP | 2000-283512 | 10/2000 |
| JP | 2000 288512 | 10/2000 |
| JP | 2005 305125 | 11/2003 |
| NL | 7711149    | 4/1979  |
| WO | WO99/41552 | 8/1999  |
| WO | WO03/004422 | 1/2003 |

* cited by examiner

*Primary Examiner*—Melvin Jones
(74) *Attorney, Agent, or Firm*—David P. Owen; Jacobus C. Rasser; Howrey LLP

(57) ABSTRACT

An evaporative cooler is disclosed comprising an amount of water, an anti microbial catalyst, and a source of ultraviolet radiation. A preferred anti-microbial catalyst material is titanium dioxide. The ultraviolet source may by natural sunlight, or it may be driven by electricity. In a preferred embodiment the ultraviolet source is an electric one, powered by a solar panel. A preferred evaporative cooler is a dew-point cooler.

10 Claims, 1 Drawing Sheet

EVAPORATIVE COOLER WITH ANTIMICROBIAL PROVISIONS

BACKGROUND OF THE INVENTION

1. Field of the Invention

The invention relates to cooling devices, in particular evaporative coolers, and more particularly to a dew-point cooler, having provisions to reduce the effects of microbial contamination.

2. Description of the Related Art

An evaporative cooler is a cooling device using the evaporation of a vaporizable liquid, in particular water, in order to achieve a cooling effect on an air stream which is to be cooled. To this end, two thermally coupled medium circuits are used, the circuits being at least partially separated by a heat transmitting partition. A first medium to be cooled flows through the first medium circuit and a second medium flows through the second medium circuit. Evaporation of a liquid present on the surface of said partition into the second medium cools the partition and absorbs heat from the first medium. Particularly efficient operation is achieved by using as the second medium, a part of the first medium after it has passed over the partition. An evaporative cooler of the dew-point type is known from WO03091633.

To achieve a substantial cooling effect, use can be made of a coating that is applied onto the heat exchanging partition and/or heat conducting elements connected with the partition, such as fins, and which is suitable for absorbing and dissipating a liquid that is added to the coating. Optionally, it is possible to use collecting means, such as a container, for the collection of surplus, non-evaporated water that could be reinserted into the cooling water circuit.

A known disadvantage of this kind of device is that they are susceptible to microbiological contamination on wet surfaces or in said liquid, including bacteria, viruses, algae, moulds and other micro-organisms. It has been shown that such contamination is particularly problematic in cases where the wet surfaces are coated with natural or semi-natural materials such as cotton, wool, viscose and the like.

BRIEF SUMMARY OF THE INVENTION

In respect of the above, the invention provides an evaporative cooler, comprising an inorganic anti-microbial catalyst and, optionally, a source of ultraviolet radiation.

In a preferred embodiment the evaporative cooler comprises:

a first medium circuit and a second medium circuit, thermally coupled to the first medium circuit using a partition that is at least partially heat conducting, both circuits being able to carry respective two media, at least the second medium containing a gas, for example air, with a relative humidity of less than 100%;

the heat conducting partition optionally comprising break-up means for breaking-up locally, at least for the zones that are actively involved in the heat transfer in both media, at least the thermal boundary layer, the laminar boundary layer, and the relative humidity boundary layer, which break-up means comprise heat conducting projections which enlarge the effective heat conducting surface of said partition;

the heat conducting surfaces of said partition and the optional break-up means at least in the range of the secondary medium at least being partially coated with a hydrophilic, for example an hygroscopic coating, said coating for example being porous and being able to absorb and retain water by capillary action and release the water by evaporation, such that the wetted coating and therefore also the heat conducting surfaces and the break-up means are cooled;

primary driving means for the primary medium, based on pressure difference, for example a ventilating fan or a pump;

secondary driving means for the secondary medium, based on pressure difference, for example a ventilating fan;

a humidification unit for subjecting the secondary medium to humidification by the water by evaporation of water from the coating, such that the evaporated liquid which is carried away by the secondary medium extracts heat from the primary medium using the heat conducting partition;

the humidification unit comprising optionally a container for capturing the surplus non-evaporated water, the container being provided with piping to supply water from the container to the coating, as well as supply piping for supplemental water, for example from the water supply system;

wherein the water circuit, made up by the piping between said components, the humidification unit, in particular the coating, and the optional container, contains an amount of an inorganic anti-microbial catalyst.

Without wishing to be bound by theory, it is understood that materials such as titanium dioxide act as catalysts or photocatalysts to provide a certain antimicrobial activity. In this way, by exposing the water to the catalyst and, in particular with frequent recirculation, the number of harmful micro organisms can be reduced to harmless proportions. Although titanium dioxide is the preferred catalyst, it is understood that other similar substances such as ZnO, CdS, $Fe_2O_3$, ZnS, $WO_3$ and $SrTiO_3$ have similar catalytic effects and are suitable for use in the evaporative coolers of the present invention. The discussion hereinbelow focuses on titanium dioxide as the catalyst, but it will be understood that other catalysts, such as the above-exemplified materials, may be substituted for titanium dioxide.

In a specific embodiment, the coating comprises a porous copolymer, a technical ceramic material, for example a fired or enamelled layer, a cement such as a Portland cement, or a fibrous material, for example a mineral wool such as rock wool or a natural or semi-natural fibre such as viscose and wherein to the coating is added titanium dioxide or wherein the coating essentially consists of titanium dioxide. An exemplary material for forming the coating is a 20 $g/m^2$ polyester/viscose 50/50 blend, available from Lantor B.V. in The Netherlands. Another exemplary material is a 30 $g/m^2$ polyamide coated polyester fibre available under the name Colback™ from Colbond N.V. in The Netherlands.

The presence of titanium dioxide in said coating ensures that all of the water is subjected to said antimicrobial activity of the titanium dioxide. The advantage of this embodiment is that the heart of the device, namely where the actual cooling occurs, is always brought into contact with all of the cooling water.

Also, an embodiment may be considered wherein the coating consists completely of titanium dioxide. Such a coating may not have the same superior water-buffering characteristics as in the case of a porous technical ceramic material or fibrous material, but it has the advantage of a very good antimicrobial activity.

In yet another embodiment, the evaporative cooler according to the invention shows the particular case that at least a part of the amount of titanium dioxide is situated in the container. For example, these parts of the wall of the container that are wetted by the water, could be provided with a coating of titanium dioxide or of a titanium dioxide containing product. Also, use can be made of surface enhancing means, for example a sponge-like structure, fins or the like to increase the effectiveness of the antimicrobial activity.

In general many methods may be used to incorporate the necessary quantity of titanium dioxide into or onto the appropriate surfaces. It may be applied in the form of a paint or coating including sputter coating, vapour deposition, nebulization electrophoretic deposition or the like. It may also be mixed with other materials such as the materials of the coating or incorporated during production into other plastics materials e.g. during extrusion or moulding of parts of the housing and water circuit. It may also be directly added to the water or liquid undergoing evaporation.

A major improvement is obtained with an embodiment, wherein the evaporative cooler comprises at least one ultraviolet source for irradiating the titanium dioxide and for increasing its photocatalytic effect. This combination in particular proves to have excellent antimicrobial activity. Experiments have shown that, by a correct choice of the effective irradiating time, all micro-organisms can be killed. Ultraviolet rays, in particular UV-A rays are also advantageous for the regeneration of the antimicrobial activity of the titanium dioxide which deteriorates with time. Irradiation can be carried out continuously or intermittently.

In a simple form of the evaporative cooler according to the present invention, a part of a housing of the cooler may be provided that is essentially transparent for ultraviolet radiation. This allows for the irradiation of the titanium dioxide using an external ultraviolet source, for example the sun. Such an evaporative cooler is very suitable for installation on the roof of a building, for example a house.

The installation should be done such that solar radiation, through the transparent part of the housing, has access to the coating or coatings, that consist entirely or in part of titanium dioxide. In such a manner it is possible to obtain an extremely effective antimicrobial activity. Of course, a condition for an effective functioning is that the cooler is used in sunny circumstances. For UV penetration, quartz glass is recommended for the transparent part of the housing. It is noted that UV radiation in general has a strong germicidal effect in its own right, particularly in the UV-C range.

The housing may also be configured to allow opening e.g. to allow periodic regeneration of the titanium dioxide by exposure to the sun. In a convenient embodiment of the present invention, the dew-point cooler may comprise a water distribution tray above the heat conducting partition for distributing the water evenly to all areas of the coating at least in the second medium circuit The water distribution tray may be provided with a quantity of titanium dioxide e.g. in the form of a coated layer. Since the water distribution tray is uppermost in the housing, opening of a lid of the housing on a sunny day may conveniently expose the titanium dioxide to regeneration by the sun's ultraviolet rays.

Additionally or alternatively, an ultraviolet source could be provided, powered by electricity in particular solar electricity.

BRIEF DESCRIPTION OF THE DRAWINGS

In the accompanying drawing, by way of example and very schematically, a dew-point cooler according to the invention is shown.

DESCRIPTION OF ILLUSTRATIVE EMBODIMENTS

Figure 1:
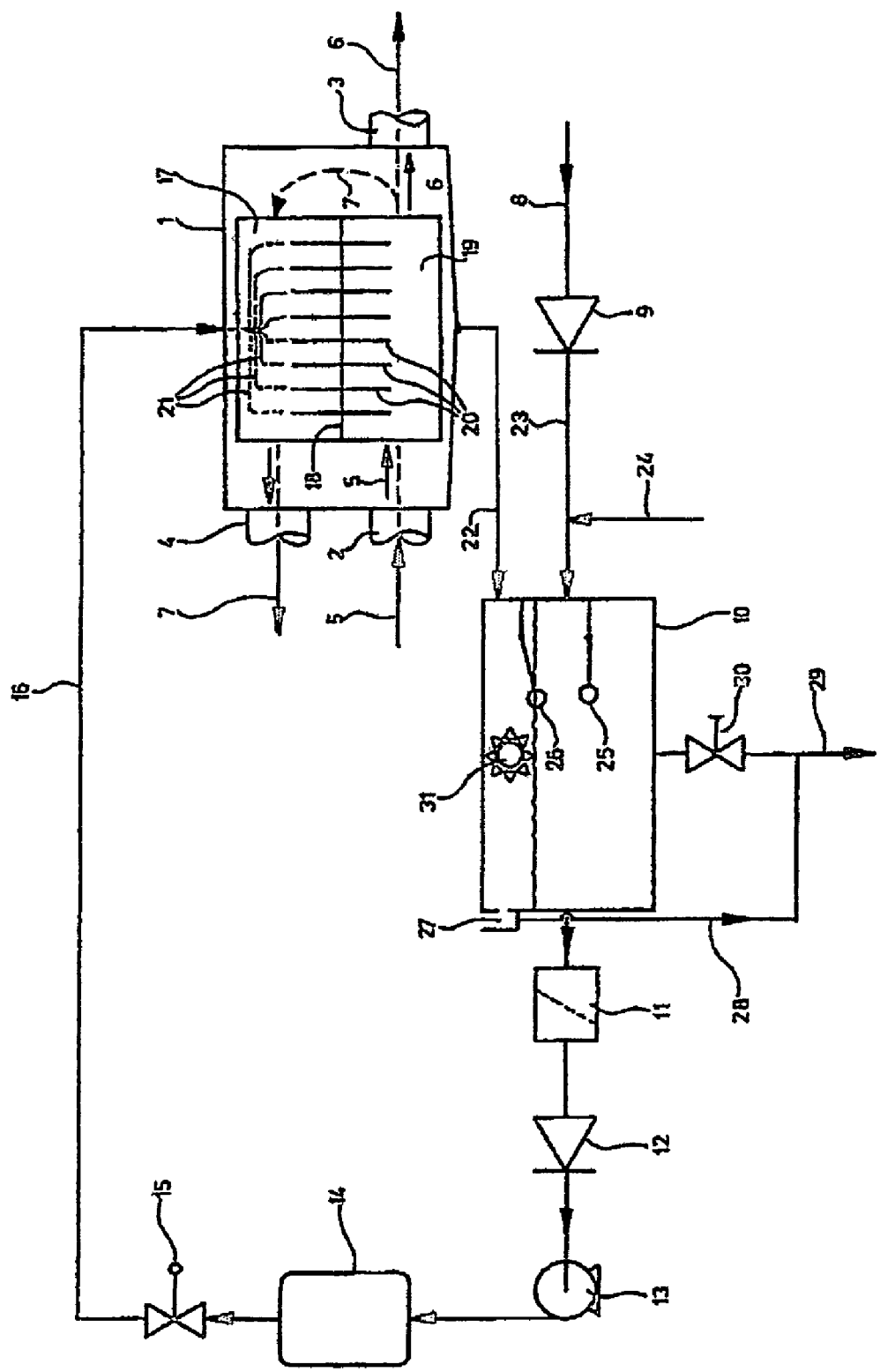

The dew-point cooler comprises the following parts: an enthalpy-exchanger 1 with a supply 2 and an exhaust 3 for a primary air current 5, respectively 6 and an exhaust 4 for a secondary air stream 7, consisting optionally of a branch stream of the primary air stream 5. The dew-point cooler may be a device as described in PCT publication Nos WO03091633, WO03091632 the contents of which are hereby incorporated by reference in their entirety.

Further, the cooling device according to the drawing comprises a water supply pipe 8 that is connected to the water supply system by means not shown. In the latter pipe a check valve 9 is situated, that is connected to a container 10 for collecting surplus, non-evaporated water, as will be described hereafter. To this container, a filter 11 is connected, followed by a check valve 12, a pump 13, and expansion tank 14 and a magnetic valve 15 that is able to run water through the pipe 16 to the secondary circuit 17 of the enthalpy-exchanger 1. Via a heat exchanging partition 18, this secondary circuit 17 is thermally connected with the primary circuit 19. The partition 18 is provided with fins 20 on both sides. On the side of the secondary circuit 17, in this embodiment the fins are provided with a coating, consisting of Portland cement mixed with an amount of titanium dioxide. The water delivered by the pipe 16 flows, without spraying, directly to the coating (not shown) on the fins, as is symbolically indicated by the dotted lines 21. Distribution of the water may be improved by use of a distribution tray (not shown) which distributes the water evenly to all areas to be wetted. The distribution tray may be provided with a titanium dioxide coating and could be irradiated by UV light on opening a lid of the housing. By the action of the air current 7, that flows along the fins 20, the water is evaporated from the coating, causing a cooling effect that is transported by the fins 20 and the heat exchanging partition 18 to the primary stream 5. A part of primary stream 5, for example about 30% is branched off as air stream 7, while the remaining part as cooled air carries on as stream 6 and may be delivered to the space to be cooled.

Surplus, non-evaporated water is fed to a drainage 22, that is connected to the container 10, receiving supplemental water through pipe 23 staring at check valve 9. To this pipe 23, a dosage of a substance to lower the surface tension, indicated with 24, can be added. In the container 10 are present a bottom float 25 to guard an imminent too low level of water and an upper float 26 to guard an imminent too high level of water in container 10. To prevent calamities, also an overflow 27 is provided that is connected by an overflow pipe 28 to a discharge pipe 29 to a sewer or other suitable drainage facility. Also the container 10 is connected through a valve 30 with said discharge pipe 29.

The inner surface of the bottom and the surfaces of the container 10 are provided with a coating, consisting of titanium dioxide. For additional activation thereof, a ultraviolet A-source 31 is used to provide increased photocatalytic activity of the titanium dioxide coating.

From the above description, it will be clear how a dew-point cooler can effectively be provided with germicidal means. In particular, the recirculation of non-evaporated water and the treatment in container 10 by UV-radiation can be extremely effective in an antimicrobial sense.

The heart 1 of the dew-point cooler can also be used without the recirculation circuit, in which case the UV-source may be abandoned or the UV-source may be incorporated in the primary circuit 17 for the irradiation of the titanium dioxide containing coating on the fins and/or heat exchanging partition 18. Also, the use of titanium dioxide in the Portland cement on the fins 20 may be abandoned, in which case, as is required by the invention, titanium dioxide should be used somewhere else in the recirculation circuit, in particular in combination with an ultraviolet source 31.

Many modifications in addition to those described above may be made to the structures and techniques described herein without departing from the spirit and scope of the invention. In particular, the devices and methods disclosed herein may also be used in conjunction with further features of the above referenced incorporated applications. Accordingly, although specific embodiments have been described, these are examples only and are not limiting upon the scope of the invention.

What is claimed is:

1. A dew-point cooler, comprising:
    a first medium circuit and a second medium circuit, thermally coupled to the first medium circuit by a partition that is at least partially heat conducting, the circuits being able to carry respective first and second media, at least the second medium containing air with a relative humidity of less than 100%;
    the partition having heat conducting surfaces which in at least the range of the secondary medium are at least partially coated with a hydrophilic coating, said coating being able to absorb and retain water and release the water by evaporation, such that the wetted coating and therefore also the heat conducting surfaces are cooled;
    primary driving apparatus for the primary medium;
    a humidification unit for humidifying the secondary medium by evaporation of water from the coating, such that the evaporated water which is carried away by the secondary medium extracts heat from the primary medium via the heat conducting partition;
    wherein a water system, comprising the humidification unit and the coating, contains an amount of inorganic anti-microbial catalyst and at least one ultraviolet source is provided for irradiating the inorganic anti-microbial catalyst.

2. The dew-point cooler according to claim 1 wherein the catalyst is titanium dioxide.

3. The dew-point cooler according to claim 1 wherein the source of ultraviolet radiation is natural sunlight.

4. Dew-point cooler according to claim 1, wherein the humidification unit further comprises a container for receiving the surplus non-evaporated water, the container being provided with piping to supply water from the container to the coating, as well as supply piping for supplying supplemental water.

5. Dew-point cooler according to claim 4, wherein at least a part of the amount of titanium dioxide is situated in the container.

6. Dew-point cooler according to claim 5, wherein the container has an interior surface, the titanium dioxide being provided on the interior surface.

7. Dew-point cooler according to claim 1, wherein the coating comprises a porous copolymer, a technical ceramic material, a cement such as a Portland cement, or a fibrous material, and wherein titanium dioxide is added to the coating or wherein the coating essentially consists of titanium dioxide.

8. Dew-point cooler according to claim 7, wherein the coating consists entirely of titanium dioxide.

9. Dew-point cooler according to claim 1, wherein the water system thither comprises a water distribution tray for distributing water to the coating and wherein an amount of titanium dioxide is provided in the water distribution tray.

10. The dew-point cooler according to claim 2 wherein the source of ultraviolet radiation is natural sunlight.

* * * * *